Aug. 26, 1952  W. BOYD ET AL  2,608,057
GAS TURBINE NOZZLE BOX

Filed Dec. 24, 1949  6 Sheets-Sheet 1

FIG.1.

INVENTORS
WINNETT BOYD
J. T. PURVIS
By
ATTORNEY

Aug. 26, 1952     W. BOYD ET AL     2,608,057
GAS TURBINE NOZZLE BOX Filed Dec. 24, 1949     6 Sheets-Sheet 3

INVENTORS
WINNETT BOYD
J.T. PURVIS
ATTORNEY

Patented Aug. 26, 1952

2,608,057

UNITED STATES PATENT OFFICE 2,608,057

GAS TURBINE NOZZLE BOX

Winnett Boyd, Bobcaygeon, Ontario, and Joseph Thompson Purvis, Toronto, Ontario, Canada, assignors to A. V. Roe Canada Limited, Malton, Ontario, Canada, a corporation Application December 24, 1949, Serial No. 134,894

4 Claims. (Cl. 60—39.37)

This invention relates to nozzle boxes of gas turbine engines with particular reference to those used in aircraft.

The primary purpose of a nozzle box is to conduct the hot gases from the combustion chambers to the turbine nozzle guide vanes. Its secondary purpose is structural, since it is commonly mounted on the backbone of the engine and serves to support the exhaust cone and other parts of the aft structure and to provide the points of support for the engine itself on the main engine mounting. The main object of this invention is to furnish an improved nozzle box for these purposes which is adequately cooled so that its structural strength is not impaired by the heat of the gases passing through it.

A further object of the invention is to provide adequate cooling in a simple manner without recourse to lagging or to static insulation which must be cooled by the circulation of a cooling medium from external sources.

All of the foregoing as well as other objects and advantages of the invention will become apparent from a study of the following specification, taken in conjunction with the accompanying drawings, wherein like characters of reference indicate corresponding parts throughout the several views and wherein.

The nozzle box illustrated is for use with an engine having six combustion chambers, and comprises a circular assembly generally indicated by the reference numeral 8, having six circular ports 9 which are adapted to register with the six combustion chambers 10 of the engine. The nozzle box is adapted to be mounted at its centre on the backbone 11 of the engine by a ring of bolts passing through a circular mounting flange 12 and carries at its outer perimeter the mounting pads 13 on which main supports of the engine in the aircraft are mounted.

The rear structure 14 of the engine is supported by the nozzle box 8 through attachment to an annular rear mounting rim 15 at the rear of the nozzle box. As previously stated, the nozzle box is intended to be a structural member; it is so constructed that the provision of the six large ports 9 does not materially affect the strength of the assembly as a weight carrying member.

Figure 2:
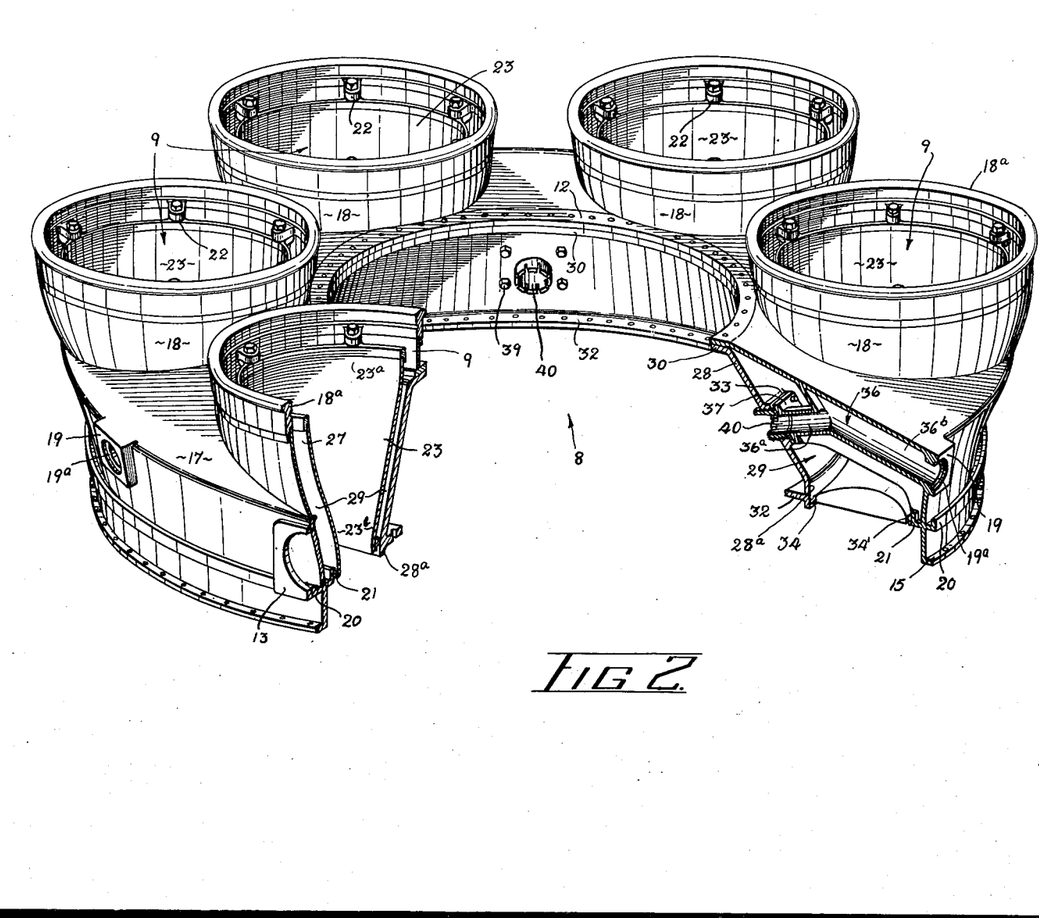
Fig. 2 is a perspective view, partly in section, of a nozzle box constructed in accordance with this invention, for a gas turbine having six combustion chambers.
Figure 2A:
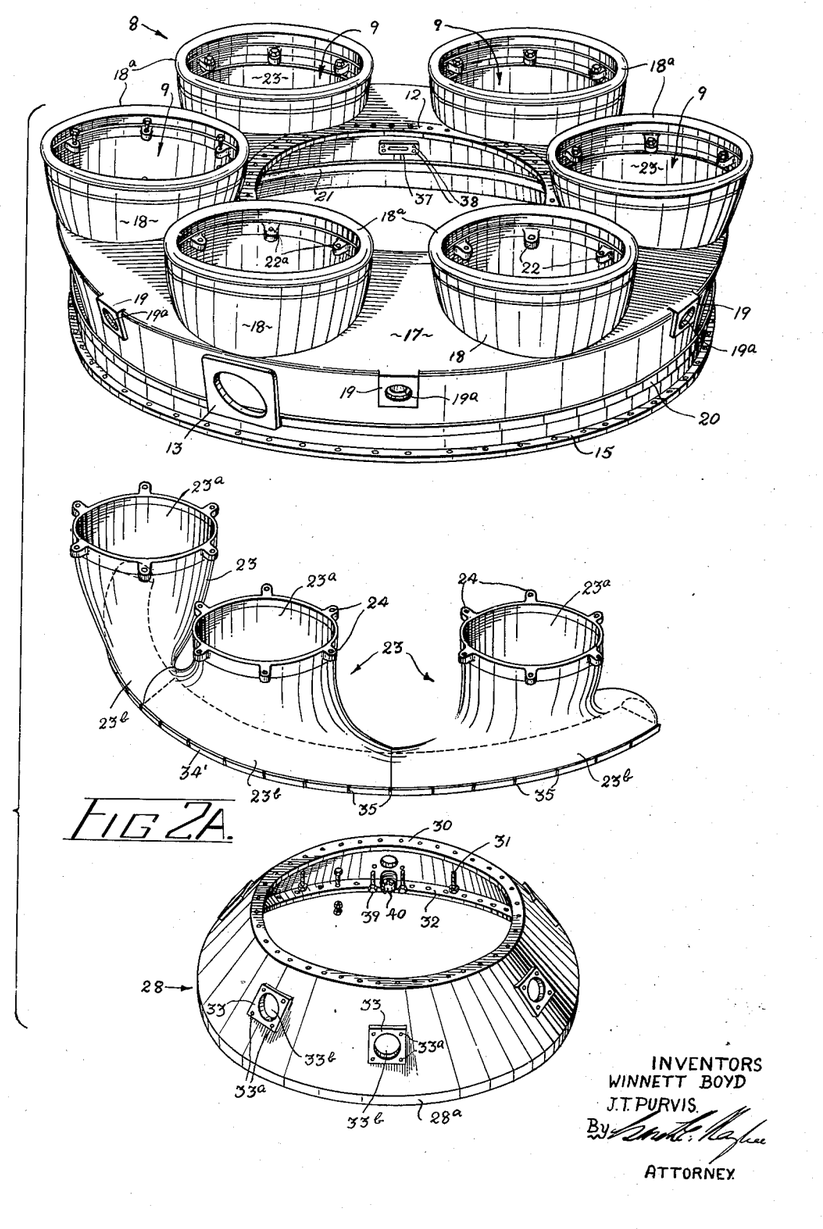
Fig. 2A is an exploded perspective view of the nozzle box shown in Fig. 2.

A detailed construction of the nozzle box is shown in Figs. 2 and 2A. The main structural member is an outer casing 17 from which extend six cylindrical structures 18 providing circular ports 9 symmetrically disposed around the circular mounting flange 12. The annular rear mounting rim 15 is located on the outer circumference of the outer casing 17, and two mounting pads 13 for attachment to the main engine supports are diametrically disposed upon the circumference of the casing. Adaptor pads 19 having circular openings 19ᵃ for attachement of the usual waste air pipes (not shown) are also spaced around the circumference. Adjacent the rear end of the casing 17, an outer right-angled flange 20 extends around the outer periphery of the casing; opposite the said flange, a similar inner flange 21 extends around the inner periphery.

Each of the cylindrical port structures is provided with a rim 18$^a$ and spaced inner mounting lugs 22 having radially elongated bolt holes 22$^a$.

Figures 4, 5:
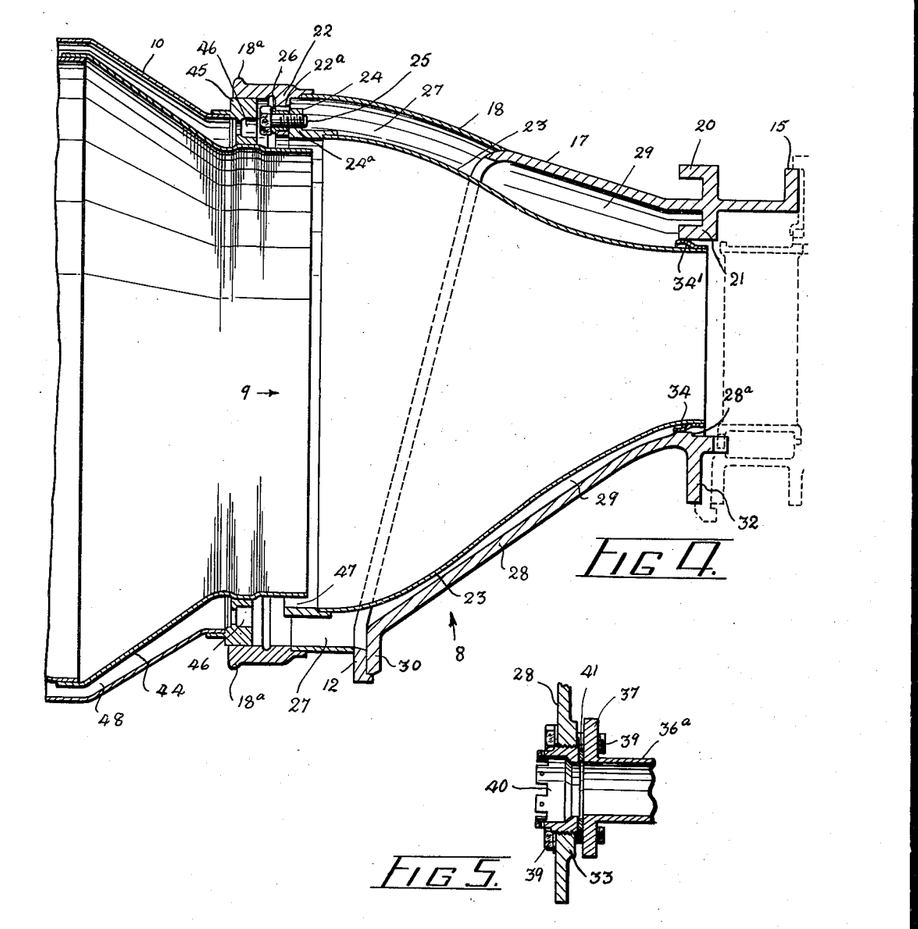
Fig. 4 is an enlarged cross-sectional view of a suitable construction for attaching the nozzle box to a combustion chamber, showing adjacent nozzle guide vanes in dotted lines.
Fig. 5 is a cross-sectional view showing the strut attachment of the inner casing to the outer casing.

Referring particularly to Fig. 2A, the outer casing 17 encloses six separate liners 23, which guide the hot gases from the six combustion chambers. Each of the liners has a cylindrical inlet portion 23$^a$, which fits within one of the cylindrical port structures 18 on the outer casing 17, and the shape of which blends into that of an outlet portion 23$^b$, which takes the form of an annulus sector. The outlet portions 23$^b$ of the six liners 23 are placed in end to end contact with each other, and together they form an annulus adapted to lie within the inner circumference of the rear of the outer casing 17 and facing the nozzle guide vanes (not shown) of the engine. Each of the cylindrical inlet portions 23$^a$ of the liners has spaced outer lugs 24 which register with the inner lugs 22 provided in the cylindrical port structures 18. The lugs 24 are provided with tapped bolt holes 24$^a$, and as shown in Fig. 4, bolts 25 in flanged bushings 26 are passed through the radially elongated holes 22$^a$ in the lugs 22 and are screwed into the tapped holes 24$^a$ in the lugs 24 to secure the liners within the outer casing 17; liners 23 are so dimensioned that there will then be an annular space 27 between the cylindrical inlet portion 23$^a$ of each of the liners and the walls of the corresponding cylindrical port structure. The bushings 26 allow the bolts 25 to be tightened without rigidly clamping lugs 22 and 24 together so that differential radial expansion may take place between the liners and the outer casing within the elongated bolt holes 22$^a$.

A frusto-conical inner casing 28 is secured within the outer casing 17 so that the liners are located between the inner and outer casings in an annular space 29 between the casings. The inner casing 28 has a circular flange 30 which is fastened by a ring of bolts 31 to the mounting flange 12 on the outer casing to secure the inner casing in place. Some of the bolts 31 may also be employed to secure the assembled nozzle box 8, including the outer and inner casings 17 and 28, to the backbone of the engine. An annular inner rim 32 at the rear of the inner casing 28 is provided to support the inner mounting of the nozzle guide vanes, and the outer circumference of said casing is shaped at its rear edge to provide a cylindrical land 28$^a$ for engagement with the liners 23.

The liners 23 are held in place at the rear between outer casing 17 and inner casing 28 by means of an inner circumferential spring strip 34 and an outer circumferential spring strip 34' secured to the inner wall and the outer wall respectively of the annular portion 23$^b$ of each of the liners 23. The spring strips 34 and 34' respectively bear against cylindrical land 28$^a$ on the inner casing 28 and against the inner right-angled flange 21 on the outer casing 17. The spring strips are S-shaped in cross-section and are slotted at intervals as shown at 35 to allow the gas flowing through the annular space 29 between the outer and inner casings 17 and 28 to escape rearwardly.

The outer and inner casings are preferably made of stainless steel, and the inner surfaces of the nozzle box, i. e., the inner surfaces of the outer casing 17 and the outer surface of the inner casing 28, are preferably highly polished to reduce absorption of radiant heat. In the spaces separating those portions of the individual liners 23 lying between the cylindrical forward portions 23$^a$ and the abutting rear portions 23$^b$, hollow struts 36 extend from the adaptor pads 19 in the outer casing 17 to the apertured pads 33 in the inner casing 28 (see Fig. 2). The struts 36 are preferably formed integrally with the outer casing 17, and each strut includes a tubular portion 36$^a$ and another portion 36$^b$ which registers with the air hole 19$^a$ provided in the adaptor pad 19. The struts are hollow so as to serve as ducts to carry waste cooling air from the central opening in the nozzle box to the outside after cooling the turbine bearings. Pipes (not shown) may be attached to the adaptor pads 19 for disposal of the waste air.

Referring particularly to Figs. 2, 2A, and 5, the tubular portion 36$^a$ of each strut 36 is attached to the inner casing 28 by means of a flange 37 provided at its inner end, the said flange being provided with tapped holes 38; the holes 38 accommodate bolts 39 which pass through bolt holes 33$^a$ in the pad 33 on the inner casing 28 and secure the flange to the casing. The bolt holes 33$^a$ in the pad 33 are somewhat larger in diameter than the bolts 39 so that there is lateral play between the strut 36 and inner casing. The air hole 33$^b$ in the centre of the pad 33 is tapped to receive a castellated hollow screw 40, the internal diameter of which is substantially equal to the internal bore of the tubular portion 36$^a$ of the strut 36. Between the inner face of the castellated screw 40 and the flange 37 on the strut 36 there is a compressible packing washer 41.

In assembling the casings, the bolts 39 are inserted and tightened sufficiently to secure the flanges 37 to the inner casing 28 without deformation; the dimensions of the parts are so chosen that such tightening will not result in actual contact between the flanges 37 and the casing. The castellated screws are inserted in the holes 33$^b$ and tightened until each packing washer is bedded against the face of the corresponding flange 37 to make a gas-tight joint without applying excessive tension to the bolts 39; with this construction exact alignment between the tubular portions 36$^a$ of the struts and the air holes 33$^b$ is not required.

Figure 3:
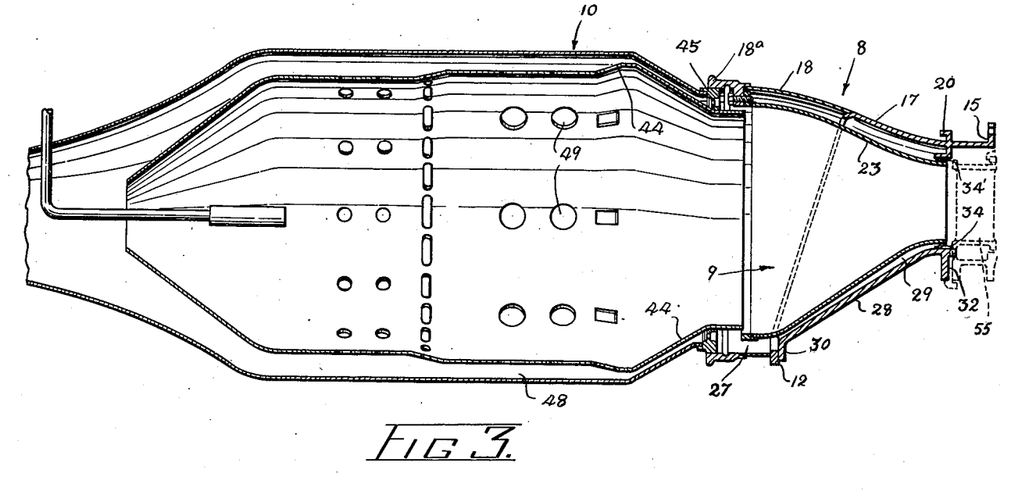
Fig. 3 is a vertical cross-sectional view showing the general arrangement of one of the six combustion chambers of a gas turbine, the said combustion chamber being shown in registration with one of the ports of the nozzle box.

The assembly of the nozzle box to one of the six combustion chambers 10 of the engine is shown in Fig. 3. Each flame tube 44 and associated combustion chamber 10 is in axial alignment with the cylindrical portion 23$^a$ of one of the liners 23. The hot gases from the flame tubes 44 inside the combustion chambers 10 flow into the nozzle box assembly 8, through which they are conducted by the liners 23 to the turbine nozzle guide vanes 55 of the engine.

Referring now particularly to Figs. 3 and 4, at the rear end of each of the combustion chambers 10 there is provided a rim 45, the outer periphery of which bears against the inner peripheral surface of the rim 18$^a$ of the registering cylindrical port structure 18, and is therefore radially secured while free to slide longitudinally. In the rim 45 are provided a plurality of symmetrically spaced holes 46, for the passage of cooling air. The inner periphery of the rim 45 bears against the surrounding wall of the flame tube 44 to secure the flame tube radially while permitting relative longitudinal movement thereof. The rear external diameter of each of the flame tubes 44 is materially less than the internal diameter of the registering liner 23 and the flame tube extends for a short distance inside the cylindrical portion 23ª of the liner, there being an annular air space 47 where the said components overlap.

Figure 1:
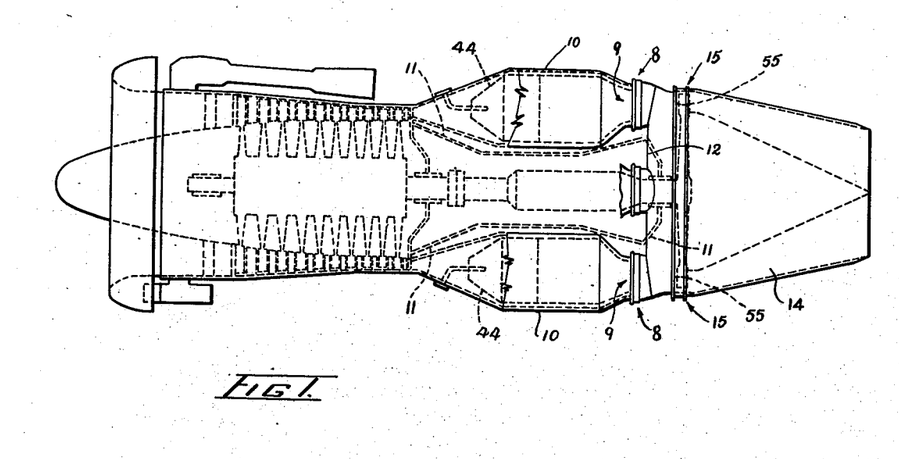
Fig. 1 is a side elevation of a nozzle box constructed in accordance with this invention, and adjacent portions of the combustion chambers, installed in a typical gas turbine engine, the principal details of which are shown in phantom lines.

In accordance with well known practice, air enters the combustion chambers 10 from the engine compressor (shown in phantom lines in Fig. 1). The greater part of the air enters the flame tubes 44, and the combustion which takes place causes a rapid acceleration of hot gases toward the nozzle box assembly 8, the hot gases passing through the liner 23 to the turbine nozzle guide vanes 55. The remainder of the air which enters each of the combustion chambers 10 flows outside the flame tube through the annular space 48 between the flame tube and the combustion chamber and while some of this air enters the flame tube through the usual perforations 49 during its passage through the combustion chamber, the remainder forms an insulating layer between the hot flame tube 44 and the outer wall of the combustion chamber 10. When it reaches the nozzle box, the insulating layer of air flows through the holes 46 in the rim 45 and enters the annular space 27 between the cylindrical portion 23ª of the liner 23 and the walls of the cylindrical port structure 18. Some of the air in this space enters the liner 23 through the annular space 47 and tends to cling to the inner surface of the liner between the wall of the liner and the main flow of hot gases. The remainder flows through the annular space 29 between the inner casing 17 and outer casing 28 and around the liners 23. Consequently, a film of comparatively cool air flows over the inner surface of each liner and insulates the liner from the very hot gases which flows through it; the air flowing in the space 29, produces additional cooling on the outer surface of the liners and minimizes the transfer of heat from the said liners to the inner and outer casings. The air flowing between the two casings finally passes through the slots 35 in the spring strips 34 and 34' and flows through the nozzle guide vanes to the turbine. The rate of flow of the cooling air may be controlled by varying the size of the slots 35 in the spring strips.

Figure 6:
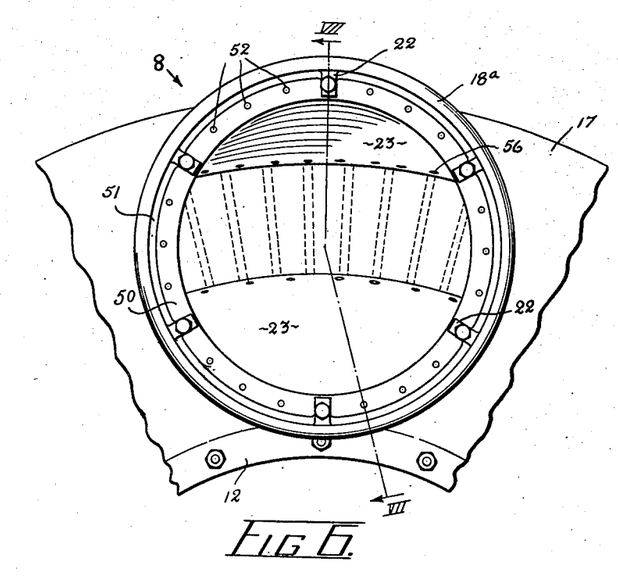
Fig. 6 is a front elevation of one of the ports of a modified nozzle box adapted to provide an alternative arrangement for attaching the nozzle box to a combustion chamber, showing adjacent nozzle guide vanes in dotted lines.
Figure 7:
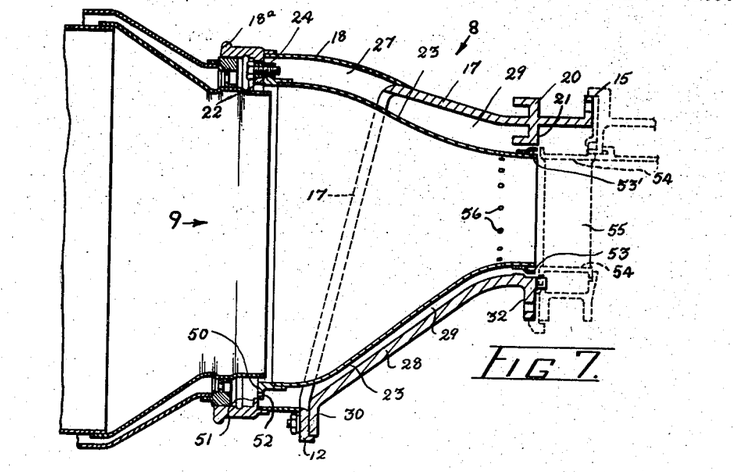
Fig. 7 is a sectional view of the port shown in Fig. 6, the said section being taken on line VII—VII in Fig. 6, the said port being shown in registration with a combustion chamber and accompanying flame tube.

In an alternative form of the invention (see Figs. 6 and 7) the spring strips 34 and 34' are dispensed with, and the rate of flow of the cooling air into the annular space 29 is controlled at the inlet to the said space. A flange 50 is provided around the outer periphery of the cylindrical inlet portion of each of the liners 23 adjacent the lugs 24. A second flange 51 extends around the inner periphery of the rim 18ª on each of the port structures 18 adjacent the lugs 22 and is arranged so that it overlaps the flange 50 to prevent passage of air between the two flanges. A ring of holes 52 located in the flange 50 allows entry of the cooling air from the annular space 48 between the flame tube and the combustion chamber 10; the cooling air passes first through the holes 46 in the rim 45 on the combustion chamber and the rate of flow of the air into the space 27 is controlled by varying the number and size of the holes 52. The total flow of cooling air into the nozzle box may therefore be regulated by varying the size and number of the holes 46, while the cooling air thus admitted is apportioned between the space 47 and the space 27 by regulating the flow into space 27 through holes 52.

In the modified form of the invention the spring strips 34 and 34' are substituted by arcuate sheet metal seals 53 and 53' respectively, secured to the rear of the liners 23. The seals 53 and 53' and the rear ends of the liners 23 are so adjusted that they are expanded rearwardly at operating temperature into a position almost touching the platforms 54 of the turbine nozzle guide vanes 55 (see Fig. 7). This results in a labyrinth type of seal which obstructs the escape of cooling air directly upon the turbine nozzle guide vanes 55 so that the air must escape through the holes 56 which are provided upstream in the liners 23.

Thus by the alternative arrangements described, the flow of air through the space 29 may be controlled either by the size of the slots 35 at the outlet, or by the size of the holes 52 at the inlet, according to choice.

By the use of a nozzle box constructed according to the invention, the conduits for the hot gases i. e., the liners 23, are protected against direct contact with the hot gases and relieved of structural loads, while the casings of the nozzle box, i. e. the inner and outer casings 17 and 28 are kept comparatively cool both by the insulating stream of air through the space 29 and by the highly polished internal surfaces of the casings which reflect heat radiated from the hot gas conduits, so that their structural strength will not be impaired. The nozzle box may therefore be lightly constructed and will nevertheless be strong enough to transmit to and through the rear engine supports the high thrust forces, gyroscopic forces and forces caused by acceleration commonly found in aircraft operation.

It is to be understood that the form of the invention, herewith shown and described is to be taken as a preferred example of the same, and that changes in the number of combustion chambers and in the shape, size and arrangement of the parts may be resorted to, without departing from the spirit of the invention or the scope of the subjoined claims.

What we claim as our invention is:

1. A nozzle box for a gas turbine engine of the type having a plurality of substantially cylindrical flame tubes arranged in a circle and each located in spaced relationship within a combustion chamber whereby an annular space for cooling air is provided between each of the combustion chambers and the corresponding flame tube, and having a turbine structure carrying turbine nozzle guide vanes at the rear of the engine, comprising a casing assembly including an inner casing and an outer casing spaced from the inner casing to provide a substantially annular space, the outer casing being a hollow annular shell having a plurality of ports disposed symmetrically around the shell and each registering with one of the combustion chambers, a hollow liner assembly disposed in spaced relationship between the inner casing and the outer casing whereby a duct for cooling air is provided between the inner casing and the liner assembly and also between the outer casing and the liner assembly, the said liner assembly comprising a plurality of liners arranged in a circle in the said annular space, each of the liners having a tubular inlet portion extending through one of the inlet ports in the outer casing and registering with one of the flame tubes and having an outlet portion which is substantially a sector of an annulus formed by all the said outlet portions of the liners, the said liner assembly being in open registration rearwardly with the turbine structure to conduct hot gases from the flame tubes to the guide vanes, the outer surface of the inlet portions of the liners being spaced from the inner peripheries of the inlet ports in the outer casing to provide passages for cooling air leading into the said duct, the said passages being in open registration forwardly with the annular spaces between the combustion chambers and the corresponding flame tubes and the said duct being in registration rearwardly with the turbine structure, the liner assembly including inner and outer spring strips adjacent the rear of the said annulus and adapted to bear against the inner and outer casings respectively resiliently to maintain the said rearward registration, the spring strips being slotted at intervals to allow passage of the cooling air and to provide an outlet for the cooling air from the said duct onto the guide vanes.

2. A nozzle box for a gas turbine engine of the type having a plurality of substantially cylindrical flame tubes arranged in a circle and each located in spaced relationship within a combustion chamber whereby an annular space for cooling air is provided between each of the combustion chambers and the corresponding flame tube, and having a turbine structure carrying turbine nozzle guide vanes at the rear of the engine, comprising a casing assembly including an inner casing and an outer casing spaced from the inner casing to provide a substantially annular space, the outer casing being a hollow annular shell having a plurality of ports disposed symmetrically around the shell and each registering with one of the combustion chambers, a hollow liner assembly disposed in spaced relationship between the inner casing and the outer casing whereby a duct for cooling air is provided between the inner casing and the liner assembly and also between the outer casing and the liner assembly, the said liner assembly comprising a plurality of liners arranged in a circle in the said annular space, the liners having openings in their walls to allow the cooling air in the said duct to flow into the liners, each of the liners having a tubular inlet portion extending through one of the inlet ports in the outer casing and registering with one of the flame tubes and having an outlet portion which is substantially a sector of an annulus formed by all the said outlet portions of the liners, the said liner assembly being in open registration rearwardly with the turbine structure to conduct hot gases from the flame tubes to the guide vanes, the outer surface of the inlet portions of the liners being spaced from the inner peripheries of the inlet ports in the outer casing to provide passages for cooling air leading into the said duct, the said passages being in open registration forwardly with the annular spaces between the combustion chambers and the corresponding flame tubes and the said duct being in registration rearwardly with the turbine structure, the liner assembly including substantially cylindrical sheet metal bands secured by their forward edges to the rear of the said annulus to provide inner and outer heat-expansible seals having their rearward edges so spaced from the turbine structure as to approach contact therewith at operating temperatures.

3. A nozzle box for a gas turbine engine of the type having a plurality of substantially cylindrical flame tubes arranged in a circle and each located in spaced relationship within a combustion chamber whereby an annular space for cooling air is provided between each of the combustion chambers and the corresponding flame tube, and having a turbine structure carrying turbine nozzle guide vanes at the rear of the engine, comprising a casing assembly including an inner casing and an outer casing spaced from the inner casing to provide a substantially annular space, the outer casing being a hollow annular shell having a plurality of ports disposed symmetrically around the shell and each registering with one of the combustion chambers, a hollow liner assembly disposed in spaced relationship between the inner casing and the outer casing whereby a duct for cooling air is provided between the inner casing and the liner assembly and also between the outer casing and the liner assembly, the said liner assembly comprising a plurality of liners arranged in a circle in the said annular space and each having a tubular inlet portion extending through one of the inlet ports in the outer casing and registering with one of the flame tubes, the said liner assembly being in open registration rearwardly with the turbine structure to conduct hot gases from the flame tubes to the guide vanes, the outer surface of the inlet portions of the liners being spaced from the inner peripheries of the inlet ports in the outer casing to provide duct inlet passages for cooling air leading into the said duct, the duct inlet passages being in open registration forwardly with the annular spaces between the combustion chambers and the corresponding flame tubes and the said duct being in open registration rearwardly with the turbine structure to provide an outlet from the duct onto the guide vanes, the inner diameters of the inlet portions of the liners being substantially greater than the outer diameters of the registering rear end portions of the flame tubes and the rear ends of the flame tubes extending concentrically within the inlet portions of the liners to provide between the liners and the flame tubes liner inlet passages for cooling air leading into the liners, the liner inlet passages being in open registration forwardly with the annular spaces between the combustion chambers and the corresponding flame tubes.

4. A nozzle box for a gas turbine engine of the type having a plurality of substantially cylindrical flame tubes arranged in a circle and each located in spaced relationship within a combustion chamber whereby an annular space for cooling air is provided between each of the combustion chambers and the corresponding flame tube, and having a turbine structure carrying turbine nozzle guide vanes at the rear of the engine, comprising a casing assembly including an inner casing and an outer casing spaced from the inner casing to provide a substantially annular space, the outer casing being a hollow annular shell having a plurality of ports disposed symmetrically around the shell and each registering with one of the combustion chambers, hollow struts extending between the inner casing and the outer casing to provide mutual support for the casing, the inner casing having apertures leading into the struts for the admission of waste air from the region within the inner casing and the outer casing having openings leading out of the struts for the emission of the waste air, a hollow liner assembly disposed in spaced relationship between the inner casing and the outer casing whereby a duct for cooling air is provided between the inner casing and the liner assembly and also between the outer casing and the liner assembly, the said liner assembly comprising a plurality of liners arranged in a circle in the said annular space and each having a tubular inlet portion extending through one of the inlet ports in the outer casing and registering with one of the flame tubes, the said liner assembly being in open registration rearwardly with the turbine structure to conduct hot gases from the flame tubes to the guide vanes, the outer surface of the inlet portions of the liners being spaced from the inner peripheries of the inlet ports in the outer casing to provide duct inlet passages for cooling air leading into the said duct, the duct inlet passages being in open registration forwardly with the annular spaces between the combustion chambers and the corresponding flame tubes and the said duct being in open registration rearwardly with the turbine structure to provide an outlet from the duct onto the guide vanes.

WINNETT BOYD.
JOSEPH THOMPSON PURVIS.

REFERENCES CITED

The following references are of record in the file of this patent:

UNITED STATES PATENTS

| Number | Name | Date |
| --- | --- | --- |
| 2,066,788 | Lysholm | Jan. 5, 1937 |
| 2,414,551 | Pavlecka | Jan. 21, 1947 |
| 2,445,661 | Constant | July 20, 1948 |
| 2,479,573 | Howard | Aug. 23, 1949 |
| 2,494,821 | Lombard | Jan. 17, 1950 |
| 2,510,645 | McMahan | June 6, 1950 |
| 2,547,619 | Buckland | Apr. 3, 1951 |
| 2,548,886 | Howard | Apr. 17, 1951 |
| 2,564,218 | Walker et al. | Aug. 14, 1951 |
| 2,565,843 | Dennison | Aug. 28, 1951 |

FOREIGN PATENTS

| Number | Country | Date |
| --- | --- | --- |
| 615,915 | Great Britain | Jan. 13, 1949 |